No. 610,167. Patented Sept. 6, 1898.
D. R. COLLIER & C. C. RATHBURN.
HUB HOLDING DEVICE.
(Application filed Nov. 5, 1897.)
(No Model.)
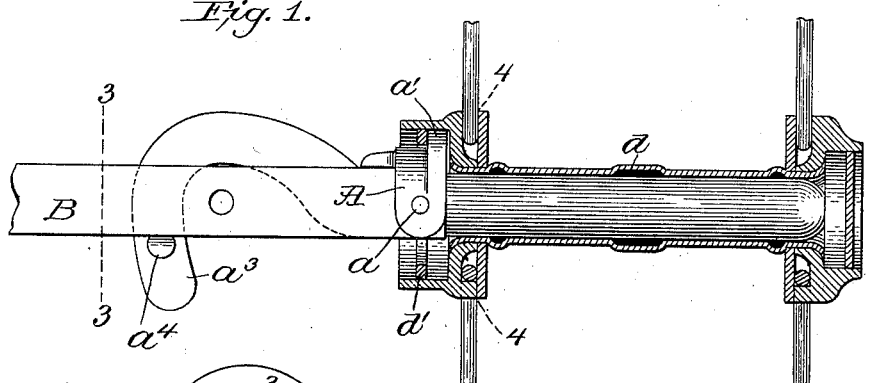
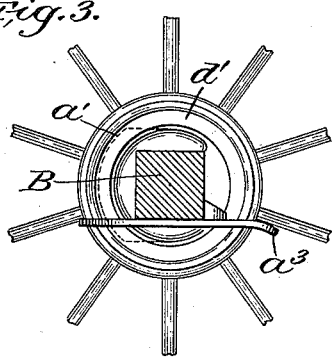
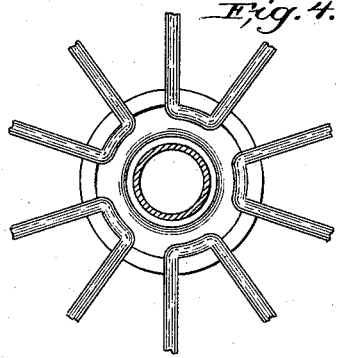
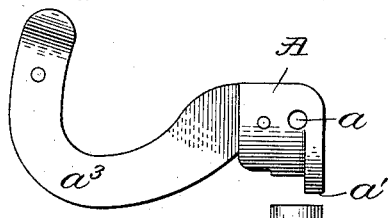
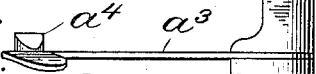

UNITED STATES PATENT OFFICE.

DAVID R. COLLIER AND CHRISTOPHER C. RATHBURN, OF GARDNER, MASSACHUSETTS, ASSIGNORS TO THE HEYWOOD BROTHERS & WAKEFIELD COMPANY, OF JERSEY CITY, NEW JERSEY.

HUB-HOLDING DEVICE.

SPECIFICATION forming part of Letters Patent No. 610,167, dated September 6, 1898.

Application filed November 5, 1897. Serial No. 657,583. (No model.)

*To all whom it may concern:*

Be it known that we, DAVID R. COLLIER and CHRISTOPHER C. RATHBURN, of Gardner, in the county of Worcester and State of Massachusetts, have invented a new and useful Hub-Holding Device, of which the following is a specification, reference being had to the accompanying drawings, in which—

Figure 1 is an elevation, partly in section, of a portion of an axle provided with our device which is shown holding the hub in place. Fig. 2 is an elevation showing our device with the hub removed, a portion of the hub being shown in dotted lines. Fig. 3 is a section on line 3 3 of Fig. 1. Fig. 4 is a section on line 4 4 of Fig. 1. Fig. 5 is a rear elevation of our device detached from the axle. Fig. 6 is a plan and Fig. 7 an end view of our device detached from the axle.

Our invention is a hub-holding device which consists of a lever pivotally attached to the axle of the vehicle and provided at one end with means to engage the hub of the wheel and at the other end with means to engage the axle of the vehicle, and thus hold the hub from endwise motion on the axle.

As shown in the drawings, the holder A is connected to the axle B by the pin $a$, on which the holder A is pivoted. The holder A is made up of a body portion and shoulder $a'$, and the spring-arm $a^3$, which is provided on one side with the projection $a^4$, constitutes a latch to lock the holder A in place.

The hub D is of a well-known form, except that it is provided with the oil-groove $d$, and one end of the hub is closed while the other is left open for the entrance of the axle. The open end of the hub is provided at its outer edge with the annular shoulder $d'$, with which shoulder $a'$ of the holder A engages, as shown in Fig. 1.

When it is desired to secure the hub in place on the axle, holder A is brought into the position shown in Fig. 2. The hub is then placed on the axle and moved endwise until the shoulder $d'$ has passed over shoulder $a'$. When holder A turns on its pivot, the projection $a^4$ on the arm $a^3$ springs past the axle, and the holder is locked in the position shown in Fig. 1. The hub is prevented from endwise motion on the axle by the engagement of annular shoulder $d'$ with the shoulder $a'$.

Hub-holding devices of this class are well known; but in all such devices known to us the holder is held in engagement with the hub by a spring, as in the patent to Lessor and Shambo, No. 141,570, dated August 5, 1873, or by some means mounted on the axle, as in the patent to Brooks and Koch, No. 457,042, dated August 4, 1891, and we are the first, so far as we are aware, to keep the holder in engagement with the hub by locking the holder to the axle.

What we claim as our invention is—

The hub-holding device above described made up of a lever pivoted to the axle and provided with means to engage the hub and with a lug to engage the axle and thereby lock the lever in place substantially as described.

DAVID R. COLLIER.
CHRISTOPHER C. RATHBURN.

Witnesses:
THATCHER B. DUNN,
FLORENCE L. MOORE.